United States Patent
Huang

(10) Patent No.: US 7,818,038 B2
(45) Date of Patent: Oct. 19, 2010

(54) HANDHELD ELECTRONIC APPARATUS WITH MULTIPLE OPERATIONAL CONFIGURATIONS

(75) Inventor: Hsiao-Chuan Huang, Tao Yuan (TW)

(73) Assignee: HTC Corporation, Taoyuan County (TW)

( * ) Notice: Subject to any disclaimer, the term of this patent is extended or adjusted under 35 U.S.C. 154(b) by 600 days.

(21) Appl. No.: 11/830,852

(22) Filed: Jul. 31, 2007

(65) Prior Publication Data

US 2008/0045282 A1 Feb. 21, 2008

(30) Foreign Application Priority Data

Aug. 16, 2006 (TW) .............................. 95130043 A

(51) Int. Cl.
*H04M 1/00* (2006.01)
*H04K 3/00* (2006.01)
(52) U.S. Cl. ................................ 455/575.4; 379/433.12
(58) Field of Classification Search .............. 455/575.4, 455/575.8; 379/433.11–433.13
See application file for complete search history.

(56) References Cited

U.S. PATENT DOCUMENTS 7,376,450 B2 * 5/2008 Chen ....................... 455/575.4
7,529,571 B2 * 5/2009 Byun et al. ............... 455/575.4
2003/0132863 A1 7/2003 Lahr
2006/0025184 A1 2/2006 Cho et al.

FOREIGN PATENT DOCUMENTS

TW M288064 2/2006

OTHER PUBLICATIONS

"Office Action of Taiwan Counterpart Application" issued on Feb. 8, 2010, p. 1-p. 4.

* cited by examiner

*Primary Examiner*—Lee Nguyen
(74) *Attorney, Agent, or Firm*—Jianq Chyun IP Office

(57) ABSTRACT

A handheld electronic apparatus with multiple operational configurations is provided. The handheld electronic apparatus includes a first body, a second body, a straight track, and a curved track. The second body overlaps the first body. The straight track is sandwiched in between the first body and the second body. The first body permits a translational motion relative to the second body along with the straight track so as to shift between a first operational configuration and a second operational configuration. The curved track connected to the straight track is sandwiched in between the first body and the second body. The first body permits a rotational movement relative to the second body along with the curved track so as to shift between the second operational configuration and a third operational configuration.

21 Claims, 4 Drawing Sheets

HANDHELD ELECTRONIC APPARATUS WITH MULTIPLE OPERATIONAL CONFIGURATIONS

CROSS-REFERENCE TO RELATED APPLICATION

This application claims the priority benefit of Taiwan application serial no. 95130043, filed Aug. 16, 2006. All disclosure of the Taiwan application is incorporated herein by reference.

BACKGROUND OF THE INVENTION

1. Field of the Invention

The present invention relates to a handheld electronic apparatus, and in particular to a handheld electronic apparatus with multiple operational configurations.

2. Description of Related Art

A handheld electronic apparatus refers to an electronic apparatus which can be held and operated in a hand of users, such as mobile phone, multimedia player, personal digital assistant (PDA), pocket PC, handheld game console, and handheld global positioning system (GPS). These electronic apparatuses usually contain smaller size and light weight so that they can be carried around with ease. Take mobile phones as an example. The early mobile phone has a vertical design. However, in order to achieve the portability of mobile phones but not to reduce the display screen size and the keypad area, a folder-type mobile phone is then developed.

Generally, the folder-type mobile phone comprises two bodies, and the side edges thereof are pivotally mounted to each other with a hinge. The primary display screen and the keypad are respectively disposed at individual inner sides of the two bodies. Thus, the folder-type mobile phone can be folded as being carried and be unfolded as being used. After the folder-type mobile phone has been prospering for a certain period, a sliding-type mobile phone is successively developed.

Compared with the folder-type mobile phone, the sliding-type mobile phone similarly comprises two bodies which are connected by a sliding member. The display screen and the keypad are respectively disposed at the outside of the upper body and at the inner side of the lower body. Therefore, the two bodies of the sliding-type mobile phone overlap as being carried and are extended as being used.

Differed from the folder-type mobile phone with a primary display screen disposed at the inner side of one of the bodies, the primary display screen of the sliding-type mobile phone is positioned at the outer side of one of the bodies. Accordingly, the display screen of the sliding-type mobile phone is exposed at the outer side of the bodies no matter in a standby mode or an active mode. To draw consumers' attention and to develop a wider variety of functions, a mobile phone with multiple operational configurations then becomes available after the constant development of the folder-type mobile phone and the sliding-type mobile phone.

To position the two bodies of the mobile phone relatively and present two different appearances, the conventional mobile phone with multiple operational configurations comprises two linear sliding tracks orthogonal to each other, so that the two bodies implement a relative sliding movement along with one of the sliding tracks in a longitudinal direction and perform a communication function, or the two bodies implement a relative sliding movement along with the other sliding track in a transversal direction and perform a typing function. However, the sliding movement implemented by the conventional mobile phone is unsmooth, stiff, and contrived.

In addition, US Patent Publication No. 2006/0025184 discloses a sliding swing apparatus of a portable apparatus which employs a guide means to perform a relative sliding movement between a body and a sliding house; moreover, a rotatable swing plate connected to a swing shaft in the guide means is adopted to implement a relative rotational movement between the body and the sliding house. Therefore, the invention disclosed in this US patent application provides the sliding plate adapted not only to slide along the longitudinal direction of the body through the guide means, but also to rotate relative to the body through the rotatable swing plate.

SUMMARY OF THE INVENTION

One aspect of the present invention is to provide a handheld electronic apparatus with multiple operational configurations so as to present a variety of appearances.

To accomplish the aforementioned and other objects, the present invention provides a handheld electronic apparatus with multiple operational configurations, wherein the handheld electronic apparatus comprises a first body, a second body, a straight track, and a curved track. The second body overlaps the first body. The straight track is sandwiched in between the first body and the second body. The first body permits a translational movement relative to the second body along with the straight track so as to shift or switch between a first operational configuration and a second operational configuration. The curved track connected to the straight track is sandwiched in between the first body and the second body. The first body permits a rotational movement relative to the second body along with the curved track so as to shift or switch between the second operational configuration and a third operational configuration.

To accomplish the aforementioned and other objects, the present invention further provides a handheld electronic apparatus with multiple operational configurations, wherein the handheld electronic apparatus comprises a first body, a second body, a straight track, and two curved tracks. The second body overlaps the first body. The straight track is sandwiched in between the first body and the second body. The first body permits a translational movement from the second body to a first side of the second body along with the straight track so as to shift between a first operational configuration and a second operational configuration. The curved tracks connected to the straight track are sandwiched in between the first body and the second body. The first body permits a translational movement from the first side of the second body to a second side adjacent to the first side of the second body along with the curved tracks so as to shift between the second operational configuration and a third operational configuration.

In view of the foregoing, the present invention operates the straight track and the curved track in coordination so as to present at least three different appearances respectively correspond to one operational configuration.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
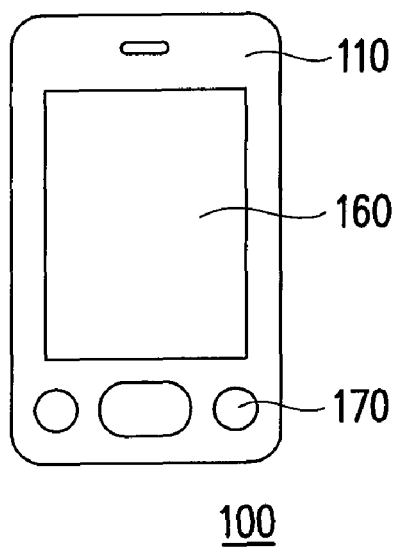
FIGS. 1A to 1C are front views respectively illustrating three different appearances of a handheld electronic apparatus with multiple operational configurations according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
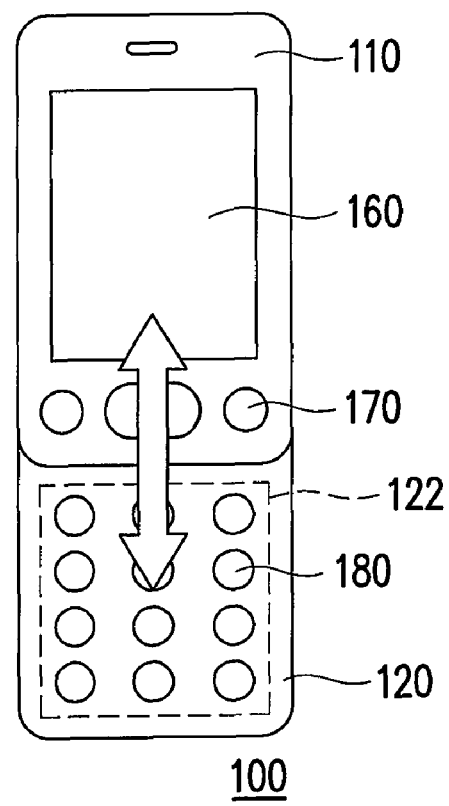
Figure 1C:
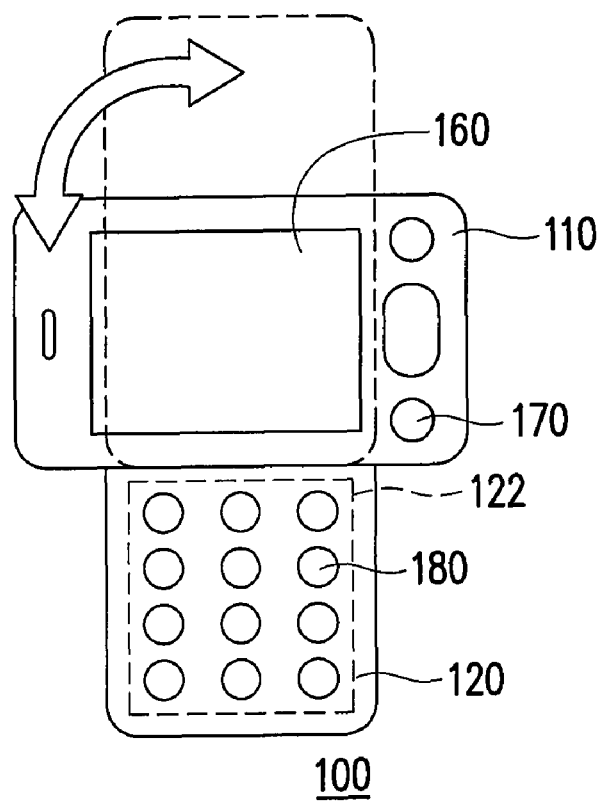
Figure 2A:
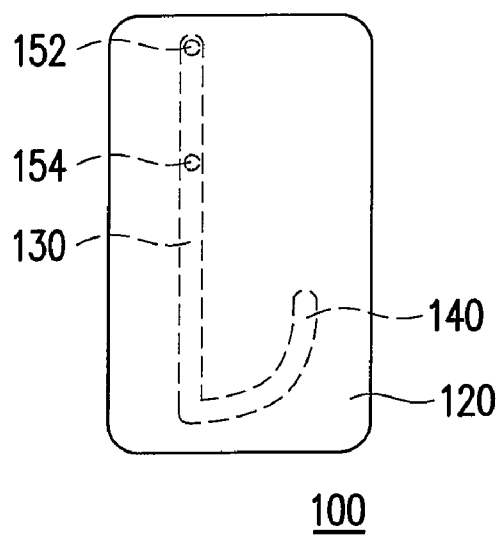
FIGS. 2A to 2C are rear views of FIGS. 1A to 1C, respectively.
Figure 2B:
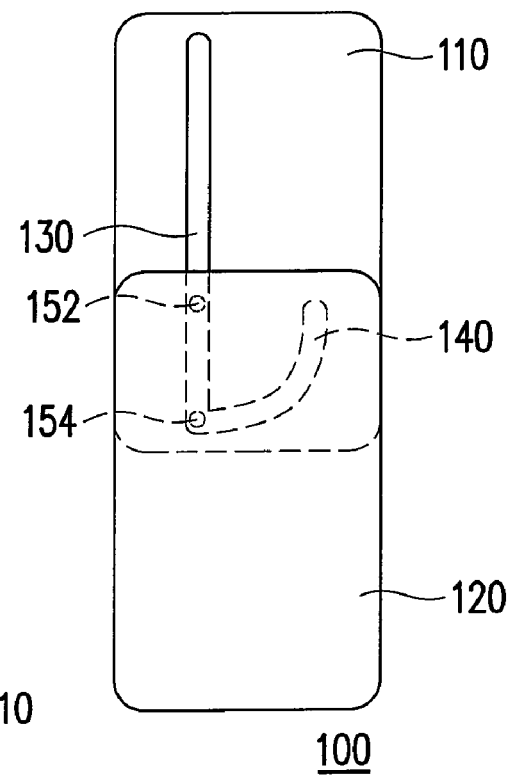
Figure 2C:
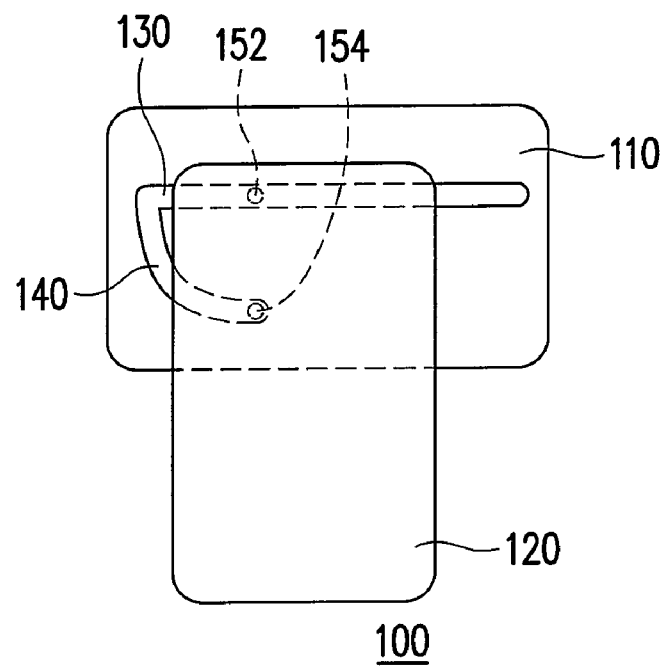

FIGS. 1A to 1C are front views respectively illustrating three different appearances of a handheld electronic apparatus with multiple operational configurations according to a first embodiment of the present invention. FIGS. 2A to 2C are rear views of FIGS. 1A to 1C, respectively. Referring to FIGS. 1A and 2A, the handheld electronic apparatus 100 of the first embodiment is, for example, a mobile phone, a multimedia player, a PDA, a pocket PC, a handheld game console, or a GPS.

The handheld electronic apparatus 100 comprises a first body 110 and a second body 120, wherein the second body 120 overlaps the first body 110. The second body 120 has an area 122 (shown in FIG. 1B). When the first body 110 and the second body 120 overlap, the first body 110 covers the area 122 on the second body 120. In FIGS. 1A and 2A, the handheld electronic apparatus 100 presents an original first appearance.

The handheld electronic apparatus 100 further comprises a straight track 130 and a curved track 140. The straight track 130 is sandwiched in between the first body 110 and the second body 120, and the first body 110 permits a translational movement relative to the second body 120 along with the straight track 130 so as to shift between the first appearance and a second appearance. In addition, the curved track 140 connected to the straight track 130 is sandwiched in between the first body 110 and the second body 120, and the first body 110 permits a rotational movement relative to the second body 120 along with the curved track 140 so as to shift between the second appearance and a third appearance.

As shown in FIGS. 1A and 2A, when the handheld electronic apparatus 100 presents the first appearance, and the first body 110 covers the area 122 (referring to FIG. 1B), the first body 110 permits a translational movement relative to the second body 120 along with the straight track 130, which leads the first body 110 to expose the area 122. Accordingly, as shown in FIGS. 1B and 2B, after the first body 110 implements a translational movement relative to the second body 120 along with the straight track 130, the handheld electronic apparatus 100 presents the second appearance.

As shown in FIGS. 1B and 2B, when the handheld electronic apparatus 100 presents the second appearance, and the first body 110 implements a translational movement relative to the second body 120 along with the straight track 130 and exposes the area 122, the first body 110 permits a rotational movement relative to the second body 120 along with the curved track 140, which leads the first body 110 to perform a rotational movement relative to the second body 120. Accordingly, as shown in FIGS. 1C and 2C, after the first body 110 implements a rotational movement relative to the second body 120 along with the curved track 140, the handheld electronic apparatus 100 presents the third appearance.

In the first embodiment, the three appearances of the handheld electronic apparatus 100 respectively correspond to three operational configurations of the operational system built in the handheld electronic apparatus 100. Thus, the translational movement implemented by the first body 110 relative to the second body 120 along with the straight track 130 results in a shift between a first operational configuration and a second operational configuration. The rotational movement implemented by the first body 110 relative to the second body 120 along with the curved track 140 results in a shift between the second operational configuration and a third operational configuration.

In the first embodiment, the handheld electronic apparatus 100 further comprises a first guide block 152 and a second guide block 154, both of which are mounted to one side of the second body 120 facing the first body 110. The straight track 130 and the curved track 140 relative to the first guide block 152 and the second guide block 154 are mounted to one side of the first body 110 facing the second body 120. The first guide block 152 is adapted to move along with the straight track 130, while the second guide block 154 is adapted to move along with the straight track 130 or the curved track 140.

Thus, when the first guide block 152 and the second guide block 154 are positioned on the straight track 130, the translational movement implemented by the first guide block 152 and the second guide block 154 along with the straight track 130 leads the first body 110 to perform a translational movement relative to the second body 120. In other words, the translational movement implemented by the first guide block 152 and the second guide block 154 along with the straight track 130 leads the first body 110 to perform a translational movement relative to the second body 120 along with the extending path of the straight track 130.

On the other hand, when the first guide block 152 is positioned on the straight track 130 and the second guide block 154 is positioned on the curved track 140, the translational movement implemented by the second guide block 154 along with the curved track 140 leads the first body 110 to perform a rotational movement relative to the second body 120 along with the curved track 140. In other words, the movements respectively implemented by the first guide block 152 and the second guide block 154 along with the straight track 130 and the curved track 140 leads the first body 110 to perform a rotational movement relative to the second body 120 along with the extending path of the curved track 140.

In order to output a visible image, the handheld electronic apparatus 100 further comprises an image output interface 160, for example, a flat panel display, which is disposed on the first body 110. Thus, when the first body 110 covers the area 122 (referring to FIG. 1B) and the handheld electronic apparatus 100 presents the first appearance and the first operational configuration, the first operational configuration performs a standby mode displayed on the image output interface 160, as shown in FIG. 1A. Furthermore, when the first body 110 exposes the area 122 and the handheld electronic apparatus 100 presents the second appearance and the second operational configuration, the second operational configuration performs a communication mode displayed on the image output interface 160, as shown in FIG. 1B. Additionally, when the first body 110 performs a rotational movement relative to the second body 120 at a preset angle, and the handheld electronic apparatus 100 presents the third appearance and the third operational configuration, the third operational configuration performs an audio/video mode displayed on the image output interface 160, as shown in FIG. 1C.

In order to enable a user to input instructions or texts, the handheld electronic apparatus 100 further comprises a first touch input interface 170, for example, a button set, which is disposed on the first body 110 and can be positioned at one side of the image output interface 160. The first touch input interface 170 is at least selected from the group consisting of a dial-up button, a direction button, a hot button, an access button, a screen button, and a hang-up button.

On the other hand, the handheld electronic apparatus 100 further comprises a second touch input interface 180, for example, a button set, which is disposed within the area 122 on the second body 120. The second touch input interface 180 is at least selected from the group consisting of a standard keypad (Qwerty), a play button, a number button, a dial-up button, a direction button, a hot button, an access button, a screen button, and a hang-up button.

Thereby, a user can operate the handheld electronic apparatus 100 through the first touch input interface 170 or the second touch input interface 180.

Figure 3A:
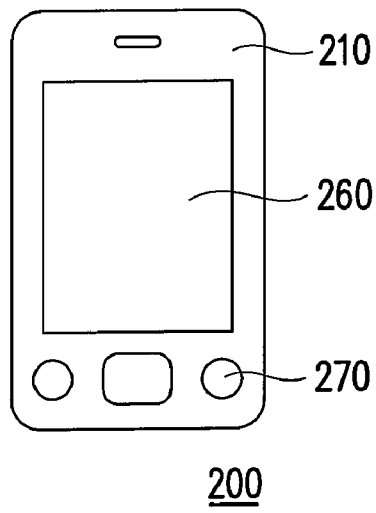
FIGS. 3A to 3C are front views respectively illustrating three different appearances of a handheld electronic apparatus with multiple operational configurations according to a second embodiment of the present invention.
Figure 3B:
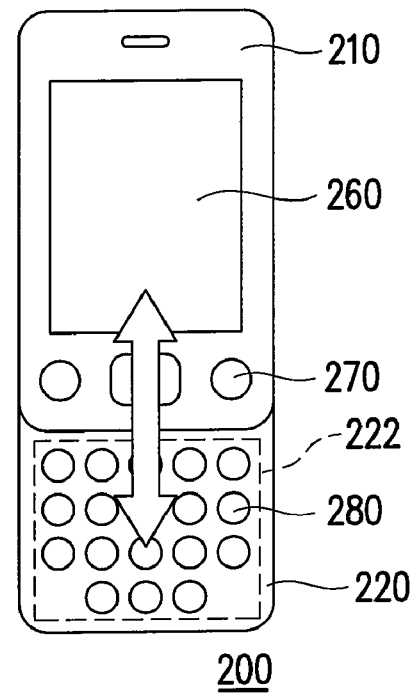
Figure 3C:
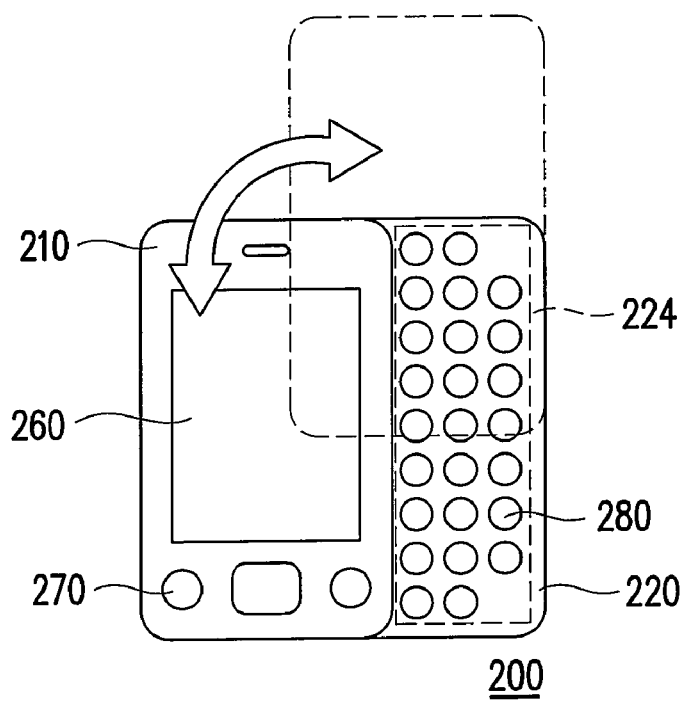
Figure 4A:
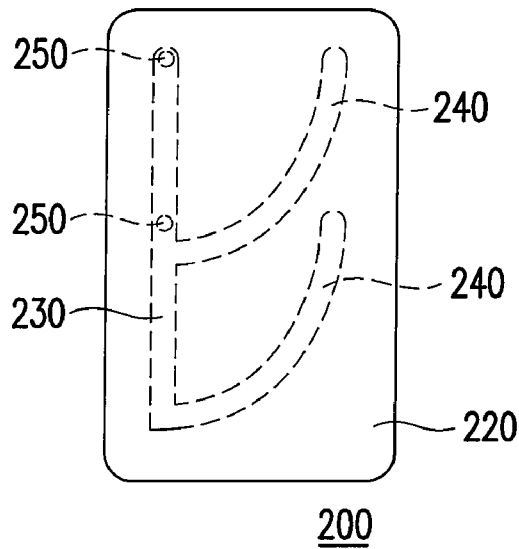
FIGS. 4A to 4C are rear views of FIGS. 3A to 3C, respectively.
Figure 4B:
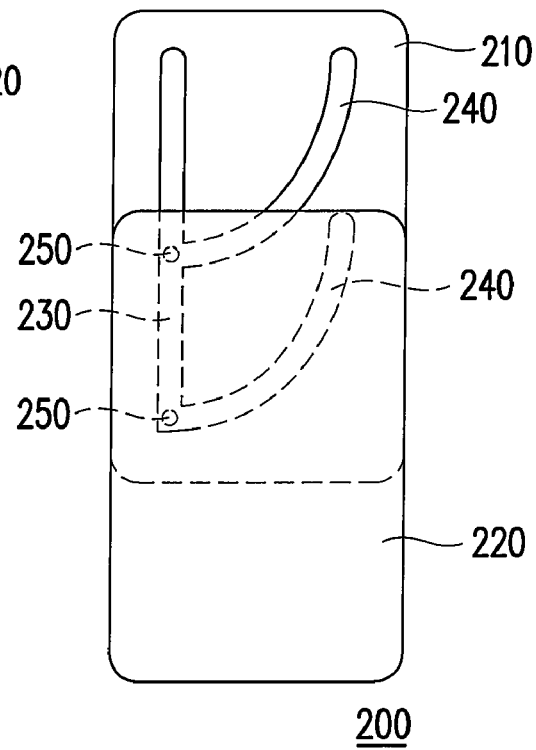
Figure 4C:
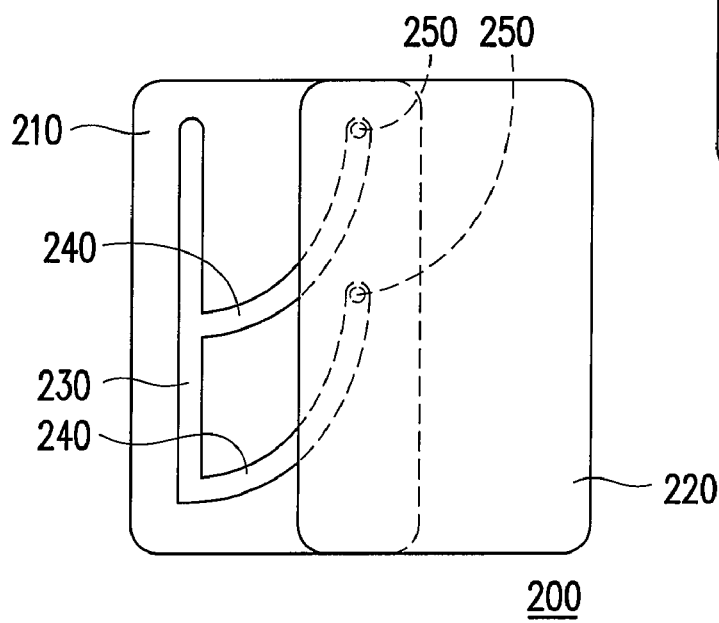

FIGS. 3A to 3C are front views respectively illustrating three different appearances of a handheld electronic apparatus with multiple operational configurations according to a second embodiment of the present invention. FIGS. 4A to 4C are rear views of FIGS. 3A to 3C, respectively. Referring to FIGS. 3A and 4A, the handheld electronic apparatus 200 of the second embodiment is, for example, a mobile phone, a multimedia player, a PDA, a pocket PC, a handheld game console, or a GPS.

The handheld electronic apparatus 200 comprises a first body 210 and a second body 220, wherein the second body 220 overlaps the first body 210. The second body 220 has a first area 222 (shown in FIG. 3B) and a second area 224 (shown in FIG. 3C). When the first body 210 and the second body 220 overlap, the first body 210 covers the first area 222 on the second body 220. In FIGS. 3A and 4A, the handheld electronic apparatus 200 presents an original first appearance.

The handheld electronic apparatus 200 further comprises a straight track 230 and two curved tracks 240. The straight track 230 is sandwiched in between the first body 210 and the second body 220, and the first body 210 permits a translational movement from the second body 220 to the first side of the second body 220 along with the straight track 230 so as to shift between the first appearance and a second appearance. In addition, the curved tracks 240 connected to the straight track 230 are sandwiched in between the first body 210 and the second body 220, and the first body 210 permits a translational movement from the first side of the second body 220 to a second side adjacent to the first side of the second body 220 along with the curved tracks 240 so as to shift between the second appearance and a third appearance.

As shown in FIGS. 3A and 4A, when the first body 210 covers the first area 222 (referring to FIG. 3B), the first body 210 permits a translational movement relative to the second body 220 along with the straight track 230, which leads the first body 210 to expose the first area 222. Accordingly, as shown in FIGS. 3B and 4B, after the first body 210 implements a translational movement relative to the second body 220 along with the straight track 230, the handheld electronic apparatus 200 presents the first appearance.

As shown in FIGS. 3B and 4B, when the first body 210 implements a translational movement relative to the second body 220 along with the straight track 230 and exposes the first area 222, the first body 210 permits a translational movement relative to the second body 220 along with the curved tracks 240, which moves the first body 210 to one side of the second body 220 and exposes the second area 224. Accordingly, as shown in FIGS. 3C and 4C, after the first body 220 implements a rotational movement relative to the second body 220 along with the curved tracks 240, the handheld electronic apparatus 200 presents the second appearance.

In the second embodiment, the three appearances of the handheld electronic apparatus 200 respectively correspond to three operational configurations of the operational system built in the handheld electronic apparatus 200. Thus, the translational movement implemented by the first body 210 relative to the second body 220 along with the straight track 230 results in a shift between a first operational configuration and a second operational configuration. The rotational movement implemented by the first body 210 relative to the second body 220 along with the curved tracks 240 results in a shift between the second operational configuration and a third operational configuration.

In the second embodiment, the second area 224 in FIG. 3C and the first area 222 in FIG. 3B partially overlap.

In the second embodiment, the handheld electronic apparatus 200 further comprises two guide blocks 250, which are mounted to one side of the second body 220 facing the first body 210. The straight track 230 and the curved tracks 240 relative to the guide blocks 250 are mounted to one side of the first body 210 facing the second body 220. The guide blocks 250 are adapted to move along with the straight curve 230 or along with the curved tracks 240, respectively.

Thus, when the guide blocks 250 are positioned on the straight track 230, the translational movements implemented by the guide blocks 250 along with the straight track 230 lead the first body 210 to perform a translational movement relative to the second body 220. In other words, the translational movements implemented by the guide blocks 250 along with the straight track 230 lead the first body 210 to perform a translational movement relative to the second body 220 along with the extending path of the straight track 230.

Moreover, when the guide blocks 250 are positioned on the curved tracks 240, the translational movements implemented by the guide blocks 250 along with the curved tracks 240 lead the first body 210 to perform a translational movement relative to the second body 220. In other words, the translational movements implemented by the guide blocks 250 along with the curved tracks 240 lead the first body 210 to perform a translational movement relative to the second body 220 along with the extending paths of the curved tracks 240.

In order to output a visible image, the handheld electronic apparatus 200 further comprises an image output interface 260, for example, a flat panel display, which is disposed on the first body 210. Thus, when the first body 210 covers the first area 222 (referring to FIG. 3B), and the handheld electronic apparatus 200 presents the first appearance and the first operational configuration, the first operational configuration performs a standby mode displayed on the image output interface 260, as shown in FIG. 3A. Furthermore, when the first body 210 exposes the first area 222 and is positioned at one side of the second body 220, and the handheld electronic apparatus 200 presents the second appearance and the second operational configuration, the second operational configuration performs a communication mode displayed on the image output interface 260, as shown in FIG. 3B. Additionally, when the first body 210 moves to another side of the second body 220, and the handheld electronic apparatus 200 presents the third appearance and the third operational configuration, the third operational configuration performs a message mode, an audio/video mode, or a word processing mode displayed on the image output interface 260, as shown in FIG. 3C.

In order to enable a user to input instructions or texts, the handheld electronic apparatus 200 further comprises a first touch input interface 270, for example, a button set, which is disposed on the first body 210 and can be positioned at one side of the image output interface 260. The first touch input interface 270 is at least selected from the group consisting of a dial-up button, a direction button, a hot button, an access button, a screen button, and a hang-up button.

On the other hand, the handheld electronic apparatus 200 further comprises a second touch input interface 280, for example, a button set, which is disposed within the first area 222 and the second area 224 on the second body 220. The second touch input interface 270 is at least selected from the group consisting of a standard keypad (Qwerty), a play button, a number button, a dial-up button, a direction button, a hot button, an access button, a screen button, and a hang-up button.

Thereby, a user can operate the handheld electronic apparatus 200 through the first touch input interface 270 or the second touch input interface 280.

In the second embodiment, as shown in FIG. 3B, when the handheld electronic apparatus 200 is under a communication mode, the second touch input interface 280 which is partially positioned within the first area 222 enables a user to input instructions or texts. Moreover, as shown in FIG. 3C, when the handheld electronic apparatus 200 is under a message or other mode, the second touch input interface 280 which is partially positioned within the second area 224 also enables a user to input instructions or texts.

In view of the foregoing, the present invention operates the straight track and the curved track in coordination so as to present at least three different appearances. Accordingly, when the handheld electronic apparatus refers to a mobile phone, the various appearances and the corresponding functions enable the handheld electronic apparatus to present different operational configurations, operating under an original (standby) mode, a communication mode, an audio/video mode, or a message mode. Thereby, it is more convenient and enjoyable for users to use handheld electronic apparatuses.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld electronic apparatus with multiple operational configurations, comprising:
    a first body;
    a second body overlapping the first body;
    a straight track sandwiched between the first body and the second body, wherein the first body implements a translational movement relative to the second body along with the straight track so as to shift between a first operational configuration and a second operational configuration;
    a curved track sandwiched between the first body and the second body and connected to the straight track, wherein the first body implements a rotational movement relative to the second body along with the curved track so as to shift between the second operational configuration and a third operational configuration;
    a first guide block mounted to the first body or the second body and adapted to move along with the straight track; and
    a second guide block, mounted to the first body or the second body and adapted to move along with the straight track or the curved track, wherein the translational movements implemented by the first and the second guide blocks lead to a translational movement relative to the second body performed by the first body along with the straight track when the first guide block and the second guide block are positioned on the straight track, and the translational movement implemented by the second guide block leads to a rotational movement relative to the second body performed by the first body along with the curved track when the first guide block is positioned on the straight track and the second guide block is positioned on the curved track.

2. The handheld electronic apparatus of claim 1, further comprising:
    an image output interface disposed on the first body.

3. The handheld electronic apparatus of claim 2, wherein the first operational configuration performs a standby mode displayed on the image output interface.

4. The handheld electronic apparatus of claim 2, wherein the second operational configuration performs a communication mode displayed on the image output interface.

5. The handheld electronic apparatus of claim 2, wherein the third operational configuration performs an audio/video mode displayed on the image output interface.

6. The handheld electronic apparatus of claim 1, further comprising:
    a first touch input interface disposed on the first body.

7. The handheld electronic apparatus of claim 6, wherein the first touch input interface is at least selected from the group consisting of a dial-up button, a direction button, a hot button, an access button, a screen button, and a hang-up button.

8. The handheld electronic apparatus of claim 1, further comprising:
    a second touch input interface disposed on the second body.

9. The handheld electronic apparatus of claim 8, wherein the second touch input interface is at least selected from the group consisting of a standard keypad, a play button, a number button, a dial-up button, a direction button, a hot button, an access button, a screen button, and a hang-up button.

10. A handheld electronic apparatus with multiple operational configurations, comprising:
    a first body;
    a second body overlapping the first body;
    a straight track sandwiched between the first body and the second body, wherein the first body permits a translational movement from the second body to a first side of the second body along with the straight track so as to shift between a first operational configuration and a second operational configuration; and,
    two curved tracks connected to the straight track and sandwiched in between the first body and the second body, wherein the first body permits a translational movement from the first side of the second body to a second side adjacent to the first side of the second body along with the curved tracks so as to shift between the second operational configuration and a third operational configuration.

11. The handheld electronic apparatus of claim 10, further comprising:
    two guide blocks, mounted to the first body or the second body and adapted to move along with the straight track or the curved tracks.

12. The handheld electronic apparatus of claim 11, wherein the translational movements implemented by the guide blocks lead to a translational movement relative to the second body performed by the first body along with the straight track when the guide blocks are positioned on the straight track.

13. The handheld electronic apparatus of claim 11, wherein the translational movements implemented by the guide blocks lead to a translational movement relative to the second body performed by the first body along with the curved tracks when the guide blocks are positioned on the curved tracks.

14. The handheld electronic apparatus of claim 10, further comprising:
an image output interface disposed on the first body.

15. The handheld electronic apparatus of claim 14, wherein the first operational configuration performs a standby mode displayed on the image output interface.

16. The handheld electronic apparatus of claim 14, wherein the second operational configuration performs a communication mode displayed on the image output interface.

17. The handheld electronic apparatus of claim 14, wherein the third operational configuration performs a message mode, an audio/video mode, or a word processing mode displayed on the image output interface.

18. The handheld electronic apparatus of claim 10, further comprising:
a first touch input interface disposed on the first body.

19. The handheld electronic apparatus of claim 18, wherein the first touch input interface is at least selected from the group consisting of a dial-up button, a direction button, a hot button, an access button, a screen button, and a hang-up button.

20. The handheld electronic apparatus of claim 10, further comprising:
a second touch input interface disposed on the second body.

21. The handheld electronic apparatus of claim 20, wherein the second touch input interface is at least selected from the group consisting of a standard keypad, a play button, a number button, a dial-up button, a direction button, a hot button, an access button, a screen button, and a hang-up button.

* * * * *